United States Patent

Wittenberger

[15] 3,651,267

[45] Mar. 21, 1972

[54] DATA COLLECTING AND TRANSMITTING SYSTEM AND APPARATUS

[72] Inventor: Wallace Wayne Wittenberger, Evanston, Ill.

[73] Assignee: Computer Management Consultants, Inc., Skokie, Ill.

[22] Filed: May 12, 1969

[21] Appl. No.: 823,586

[52] U.S. Cl. ....................179/2 DP, 179/6 R

[51] Int. Cl. ....................H04m 11/06

[58] Field of Search ....................179/2, 2 DP, 5.5, 6, 2 R, 6 R, 179/6 AC, 90 BD, 90 BB; 178/17; 340/365

[56] References Cited

UNITED STATES PATENTS

| | | | |
|---|---|---|---|
| 3,430,004 | 2/1969 | Shenk | 179/90 |
| 3,427,402 | 2/1969 | Stokes | 179/2 |
| 3,417,202 | 12/1968 | Kolpek | 178/31 |
| 3,403,225 | 9/1968 | Mislan | 179/2 |
| 3,401,396 | 9/1968 | Wolf et al. | 396/74 |
| 3,400,378 | 9/1968 | Smith et al. | 340/172.5 |
| 3,388,375 | 6/1968 | Sloughter | 340/18 |
| 3,381,276 | 4/1968 | James | 340/172.5 |
| 3,301,958 | 1/1967 | Blakeslee et al. | 179/6 |
| 2,827,515 | 3/1958 | Zuber | 179/5 |
| 2,398,755 | 4/1946 | Shepherd | 179/4 |
| 3,508,002 | 4/1970 | Haver | 179/2 DP |

*Primary Examiner*—Kathleen H. Claffy
*Assistant Examiner*—Tom D'Amico
*Attorney*—Merriam, Marshall, Shapiro & Klose

[57] ABSTRACT

A data collecting and transmitting system and apparatus collecting digital data and converting the data to a series of coded tones for transmission to a central data terminal, and means for recording the coded tones for subsequent reconversion to the original digital data. In one specific embodiment the original digital data is converted into coded tones compatible with transmission over a voice grade telephone line interconnecting the central data terminal and one or more data collecting stations, and means are provided for the immediate recording of the coded tones either at the data station and/or at the central data terminal. Apparatus providing a coded ring-in timing sequence, station "status tones," and a selective playback operation are included in the overall system interconnecting the central data terminal with a plurality of collecting data stations.

6 Claims, 6 Drawing Figures

INVENTOR
Wallace Wayne Wittenberger
BY Merriam, Marshall, Shapiro & Klose
ATTORNEYS INVENTOR
Wallace Wayne Wittenberger
BY Merriam, Marshall, Shapiro & Klose
ATTORNEYS INVENTOR.
Wallace Wayne Willenberger BY Merriam, Marshall, Shapiro & Klose
ATTORNEY INVENTOR.
Wallace Wayne Wittenberger BY Merriam, Marshall, Shapiro & Klose
ATTORNEYS INVENTOR
Wallace Wayne Wittenberger
BY Merriam, Marshall, Shapiro & Klose
ATTORNEYS.

DATA COLLECTING AND TRANSMITTING SYSTEM AND APPARATUS

BACKGROUND OF THE INVENTION

This invention relates to data collecting and transmitting apparatus and systems, and in particular to apparatus and a system for collecting and transmitting generated data from a plurality of data stations to a data collection center.

The present invention is especially applicable for use in connection with business machine type data commonly generated by or entered into an input data machine during, for instance, payroll operations, inventory updating, retail sales transactions, etc. Temporary storage of such continuously generated business machine data is currently provided on punched paper tape or an incremental magnetic tape which stores the data in digital form for later processing at a data center. One common operating procedure is to store the paper tapes at each outlying location and thereafter periodically, or when requested, send in the information to the data center in digital form over high speed (wide band) data lines, or by manually transporting the tapes to the data center.

An alternative procedure involves sending the information over standard, relatively narrow band telephone lines. However, in order to transmit this data over such telephone lines, which is a convenient and most desirable line of communication, the digital information on the paper tape must be converted into a form compatible to telephone line transmission. This requires a paper tape reader for detecting and converting the information from digital form to a closed contact arrangement. Further conversion must then be made from the closed contact arrangement to a coded tone format suitable for telephone line transmission. It is not economically feasible, especially in a system having a large number of remote data collecting stations, to employ such relatively expensive paper tape punches, readers, and associated converter equipment at each data station. The same problem exists with similar procedures wherein data is stored in digital form and in other formats, such as incremental magnetic tape or punched cards, since relatively expensive apparatus must not only be used for the data gathering and storing, but an additional expensive reader—magnetic tape reader or punched card reader, is required to retrieve the digital data so it can be converted into a form suitable for telephone line transmission.

SUMMARY OF THE INVENTION

In accordance with the principles of the present invention, there is provided apparatus wherein potentially continuously generated digital data, such as business machine data, is entered in digital form at a plurality of remote stations, with the respective data upon entry being immediately and directly converted to a series of coded tones and stored on standard audio magnetic tapes. The coded tones can be: (1) immediately transmitted over regular, voice grade telephone lines and recorded at a data center for later conversion to the original digital form; or (2) temporarily recorded at the remote station and thereafter transmitted to the data center.

In the last mentioned aspect of this invention, numeric information at each station is converted to the standard two out of seven code system commonly used for dialing over telephone lines, and is simultaneously recorded on one of the two tapes provided at each station. The recorded tones are transferred to the central data terminal on a first in - first out basis, and the dual recording capability of this system enables continued recording of input data on one tape while operating the other tape in the playback transfer mode.

Thus, it must be noted that the apparatus and system of this invention eliminates the requirement in current business machine practice of expensive paper tape punches which must be continually reloaded with paper tape as used during the continuous recording of business machine data. Furthermore, the inavailability of a practical storage buffer between tape punch and read operations in attempting a complete data transmission system over voice grade telephone lines is bypassed with the apparatus and system of the present invention.

In the present invention, the utilization of standard audio magnetic recording tape to record the coded tones representing the digital data provides an inexpensive technique for storing a very large amount of data. Assuming, for instance, each tape has 500 feet per cartridge, with a four track capability per tape side, and at a tape speed of 3 ¾ inches per second, 6,400 recording seconds can be provided per cartridge.

Further assuming a recording speed of 20 characters/second and that a transaction can be provided by 20 characters/block, each tape can store a maximum of 6,400 transactions.

Other important aspects of this invention are concerned with: (1) providing a "scribble tone" on the tape then in the record mode when neither of the tapes is filled with data and an attempt is made by the central data terminal to establish a connection to the data station, and detection of such a tone during playback to terminate the playback operation and thereby eliminate wasted online, non-data transmission time with the data center; (2) providing a ring-in timing sequence to insure that only the central data terminal can connect to the station and thereby preventing an unauthorized user from getting online to the station and having access to the recorded data; and (3) providing "status tones" which are automatically transmitted to the data center to indicate the status and operational condition of the station.

BRIEF DESCRIPTION OF THE DRAWINGS

The invention will be better understood from the following detailed description thereof taken in conjunction with the accompanying drawings in which.

GENERAL SYSTEM DESCRIPTION

Figure 1:
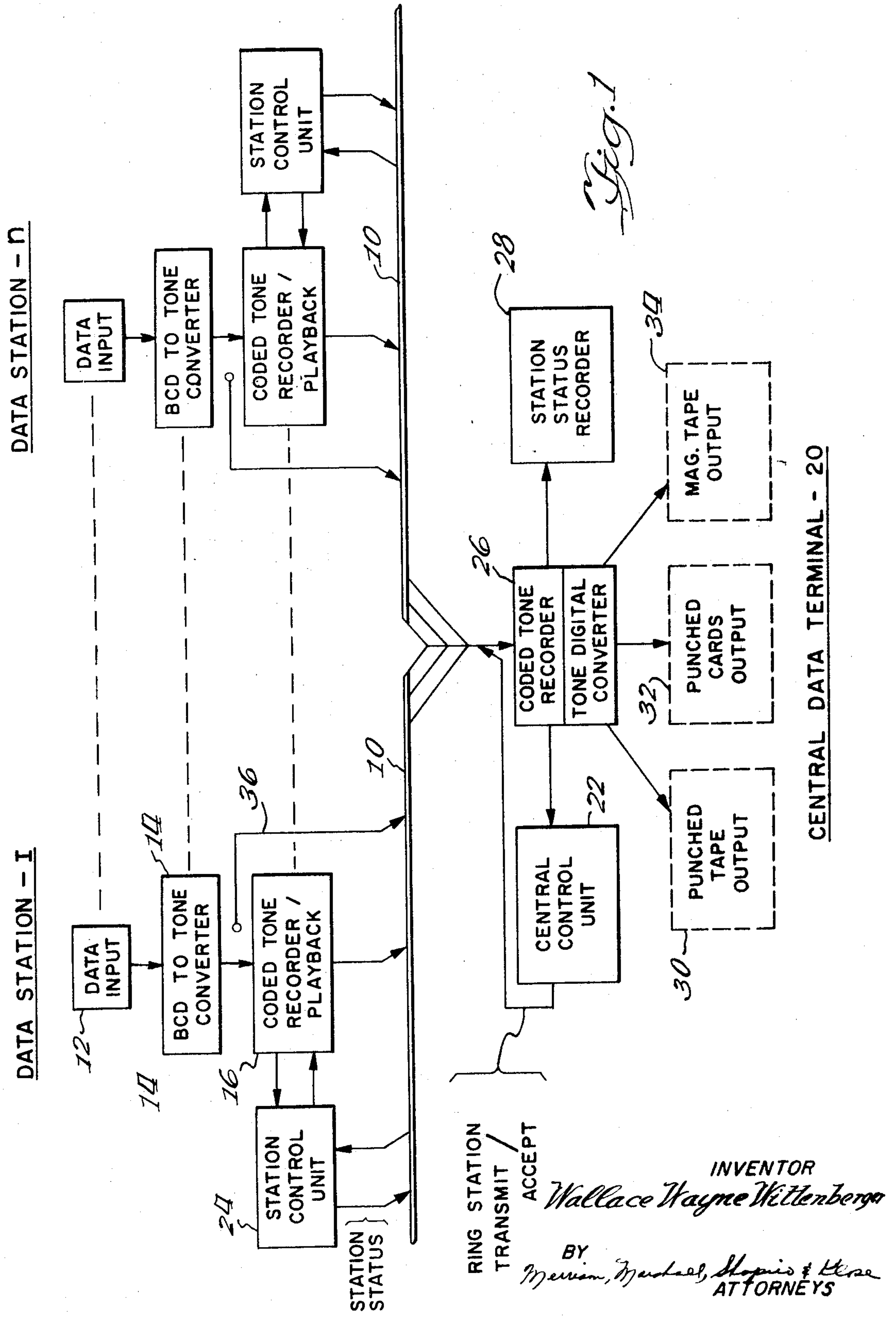
FIG. 1 is a schematic illustration of one embodiment of a system according to the invention, wherein a plurality of remote data stations communicate with a central data terminal.

Referring now to FIG. 1 there is illustrated in block diagram form the basic apparatus of one embodiment of a system according to the invention and the flow paths of information within such a system. In general, there is shown a plurality of remote data collecting stations I through station *n*, each of which communicates through a respective telephone line 10 with the central data terminal. For purposes of illustration only a first Station I and a final Station *n* have been illustrated in FIG. 1, it being assumed that there are in accordance with the principles of this invention a plurality of stations each capable of interconnection through respective telephone lines and associated switching offices to the central data terminal.

Each station contains one or more data input devices 12 (for convenience of illustration only one of which is shown in FIG. 1) for entering the particular data in connection with the business operation being performed at the respective station. As an example, the data input device 12 can represent schematically a cash register for indicating retail sales. In this connection, as the sales person enters the information pertaining to the sale, the output of the unit is digital data representing the transaction. The input device may also contain a card reader, such as for reading the information on the customer's credit card inserted into the input device. In FIG. 1, it is assumed that the information in the input device 12 is in binary coded decimal (BCD) form, although it is to be understood this is merely for purposes of illustration, since the principles herein can as well be applied to other digital coded arrangements, such as quinary, which may be preferred in certain situations. The BCD information is transformed into coded tones by the tone converter 14 and suitably recorded on standard audio tape in the coded tone recorder/playback unit 16, with each station continuously recording and storing the information in coded tone form until a request is sent out from the central data terminal 20. The data terminal 20 sequentially rings each station over the telephone lines 10 by means of a central control unit 22 which dials the particular number and rings the station control unit 24 of the selected station. Means are provided within the station control unit, as will be more particularly described hereinafter, for insuring that the station has been contracted by the proper party, namely data terminal 20, rather than an unauthorized user. The station control unit 24 then proceeds to transmit status tones to data terminal 20, which tones indicate to the data terminal the operating condition and status of the recorder in each particular station. At the central data terminal 20 the status information is coupled from the particular telephone line 10, recorded in a coded tone recorder 26 (similar to recorder 16) and transformed by a coded tone to output converter, it being understood the data terminal communicates with only one station at a time through the associated telephone line. The equipment at the central data terminal is standard, and is available in present form or can be readily modified by those skilled in the art to provide the operations hereinafter described.

After the central control unit has determined the operating status or condition of the called station, a Transmit tone is sent from data terminal 20 to the particular station control unit 24. The Transmit tone in effect initiates playback of the information on the station recorder 16, which information is sent back along the connected telephone line 10 to the coded tone recorder-output converter 26, and from this unit to any suitable output means at data terminal 20. For purposes of illustration, the coded tones at recorder 26 can thereafter be converted to the original digital data to punch tape, punch cards, or be recorded on magnetic tape as illustrated by the reference numerals 30, 32 and 34, respectively in FIG. 1. If the transmission of data has been satisfactory, and has been accepted by the data terminal 20, an Accept signal is sent via central control unit 22 to the called station to initiate an automatic timed hang-up procedure. The control unit 22 then sequentially steps to the next selected station and the above procedure for collecting the stored information at this station is then repeated.

Alternatively, upon entry of digital data at the data station, the corresponding coded tones can be immediately transmitted with or without station recording to the central data terminal through line 36 and recorded on the coded tone recorder 26 for later conversion to the original digital data.

DETAILED DESCRIPTION

The above description in connection with FIG. 1 has been given in order to familiarize one with the basic concepts underlying the present invention. In the following detailed description hereinafter, a more complete structural and operational description will be presented. The illustration of such structure is in block diagram or schematic form, since the blocks individually represent structure which is within the skill of the art for performing the following operational requirements. As one example of the present invention, the data station consisting of data input 12, converter 14, recorder 16 and control 24 can be a portable device which, for instance, can be wheeled outdoors next to the pumps of a gas station so the attendants can enter the customer's identification number (or a suitable card reader can be provided for retrieving such data), gallons of gas purchased, amount of sale, etc. The portable unit is wheeled in at the end of the business day and connected to the telephone line 10 for transmission of the recorded coded tone data to the central data terminal.

Figure 2:
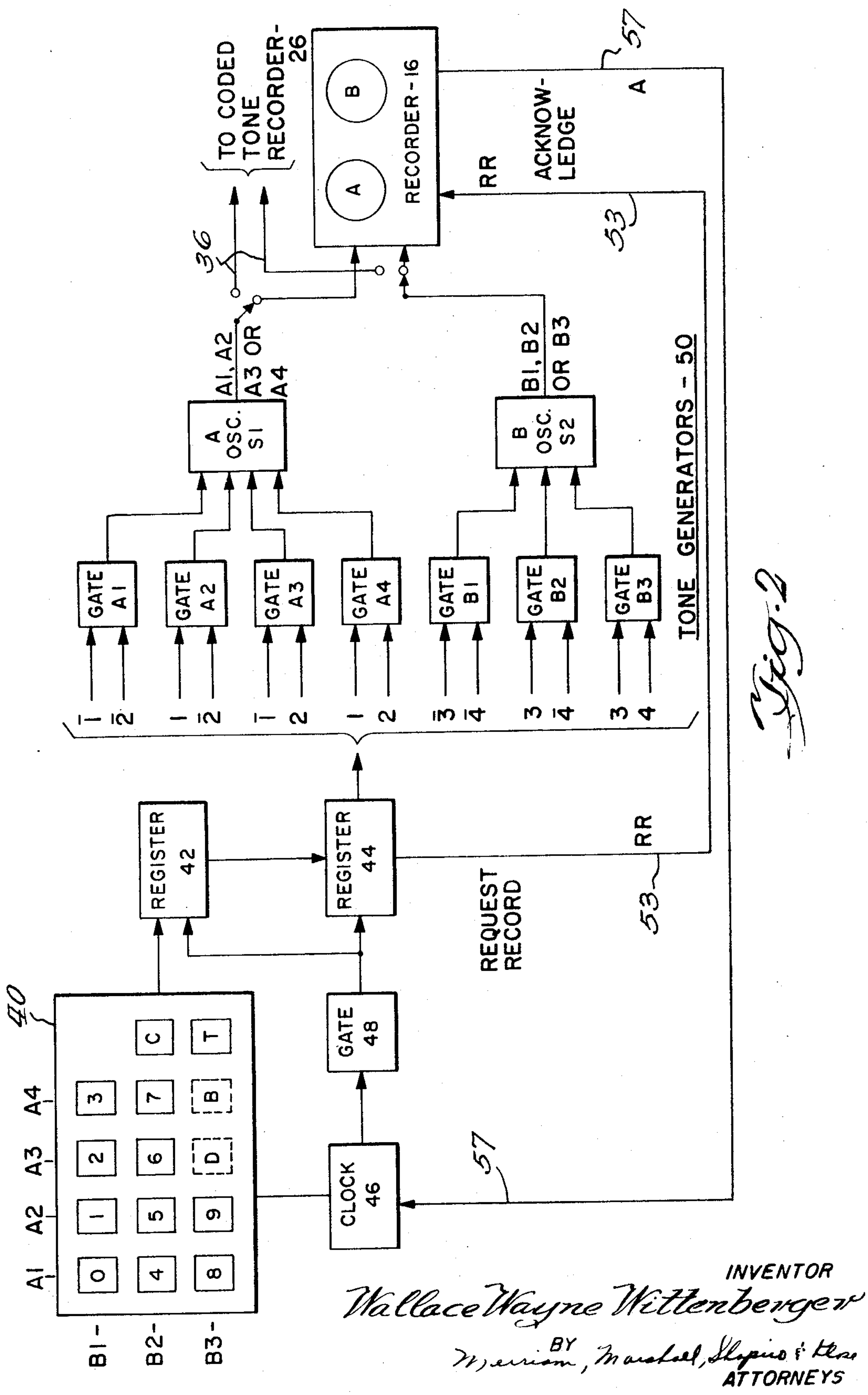
FIG. 2 illustrates one example of remote data station apparatus for collecting digital data, and converting the data to coded tones for recording either at the data station or at the central data terminal.

The following detailed description set forth a complete system for enabling a central data terminal to obtain information from a plurality of such portable or stationary data stations wherein the input device 12 for purposes of illustration is a keyboard for entering the transaction in connection with a retail sale at the particular station. The keyboard 40 in FIG. 2 is used to enter the desired numerical information through the numbers keys 0 through 9; whereas, the function key C is used to clear the register 42 if the entered data displayed on display 41 is incorrect, and the T key is used to terminate and transfer data. The operation of one of the numbers or digit keys 0 through 9 provides, in the common BCD format, four binary bits which are parallel entered into the register 42. When the operator has completed the serial entry of the digits representing a data word, he operates key T which terminates and transmits either a full block (if entered) or a partial block and records a special character following the last data character to indicate the end of the actual data word (EOD). A second special character (internally generated) is sent after the last potential data character to indicate the end of the data block (EOB). If a full block is sent, the special partial block character (EOB) is omitted. Common keyboard - register apparatus is readily available to perform such operations. Additional function keys as required may be added, and it is to be understood the present description is given only for illustrations of the principle of the invention. Horizontal generated parity can be provided by an extra data character just preceding the end of block indication (EOB).

Actuation of the T key also locks the information into register 42. If register 44 is empty, data is transferred in parallel to register 44 and register 42 is cleared. Then the entry of data in register 44 is held and a Request to Record (RR) signal is sent to recorder 16. When the recorder is ready, an Acknowledge indication (A) is sent from recorder 16 to register 44. The Acknowledge signal starts clock 46 and gate 48. Complete transmission of the data block before removal of the Acknowledge signal removes the Request to Record and resets register 44 to zero. If the Acknowledge signal is removed during transmission, the clock is set back to zero, and data is held in register 44. Reappearance of the Acknowledge signal causes a start of the complete retransmission of the data block held in register 44.

The information from register 44 is still in binary coded form, and in order to convert such information into the two out of seven coded tones, there are provided seven tone generators 50 divided into two groups, A1 through A4, and B1 through B3 as shown in FIG. 2. The A tone generators comprise an audio oscillator 51 with the A1, A2, A3 and A4 gates connecting an appropriate resonant circuit to the oscillator to provide only one of the A tones. Similar apparatus is provided for the B tone generators.

For purposes of illustration, the two out of seven coded tone designations are shown adjacent to the keyboard 40 in order that they may be readily related to the corresponding numbers keys 0–9, and the end of data word (EOD) and end of data block (EOB) codes as shown by the "D" and "B" notations within the dashed blocks. (No "D" or "B" keys are provided, however, the corresponding dashed blocks have been illustrated in FIG. 2 for convenience in relating the associated notations with the corresponding coded tones.) As an example, the numeral 2 would be represented by tones A3 and B1, whereas the numeral 9 would be represented by tones A2 and B3. Thus, assuming the information in the position in register 44 which is to be moved represents the numeral 2, at this bit position there would be stored four bits, namely, 1, 2 and 3, 4. The first two data bits designate tones A3 and the second two bits designate tone B1, which set of coded tones correspond to the numeral 2. Operation of the T key automatically generates the A3, B3 tones for an end of data word indication, or the A4, B3 tones for an end of data block indication.

As an example, the following audio frequencies have been designated for the A and B tones:

| | | | |
|---|---|---|---|
| A1 | 697 Hz. | B1 | 1209 Hz. |
| A2 | 770 Hz. | B2 | 1336 Hz. |
| A3 | 852 Hz. | B3 | 1497 Hz. |
| A4 | 941 Hz. | | |

It is to be understood that the two out of seven code system is a portion of the well known three out of 14 system. Use of the latter system can provide complete alpha-numeric capability without special coding of two numeric characters to describe an alpha character. Thus, the two out of seven code system has been illustrated herein only as an example, and the present invention can as well be utilized with other coding schemes compatible with telephone line transmission, including, for instance any *n* out of *m* coding scheme and others well known to those skilled in the art.

RECORDING

Suitable connections are made to enter the coded tones into either tape A or tape B of recorder 16. The recorder 16 contains the two endless tapes A, B so that while one tape is recording information from the audio tone generators, the other tape can be operated in playback for returning the previously recorded information to the data terminal. Each of the tapes A and B has eight recording tracks and includes associated recording, playback, and erase heads.

Figures 3, 6:
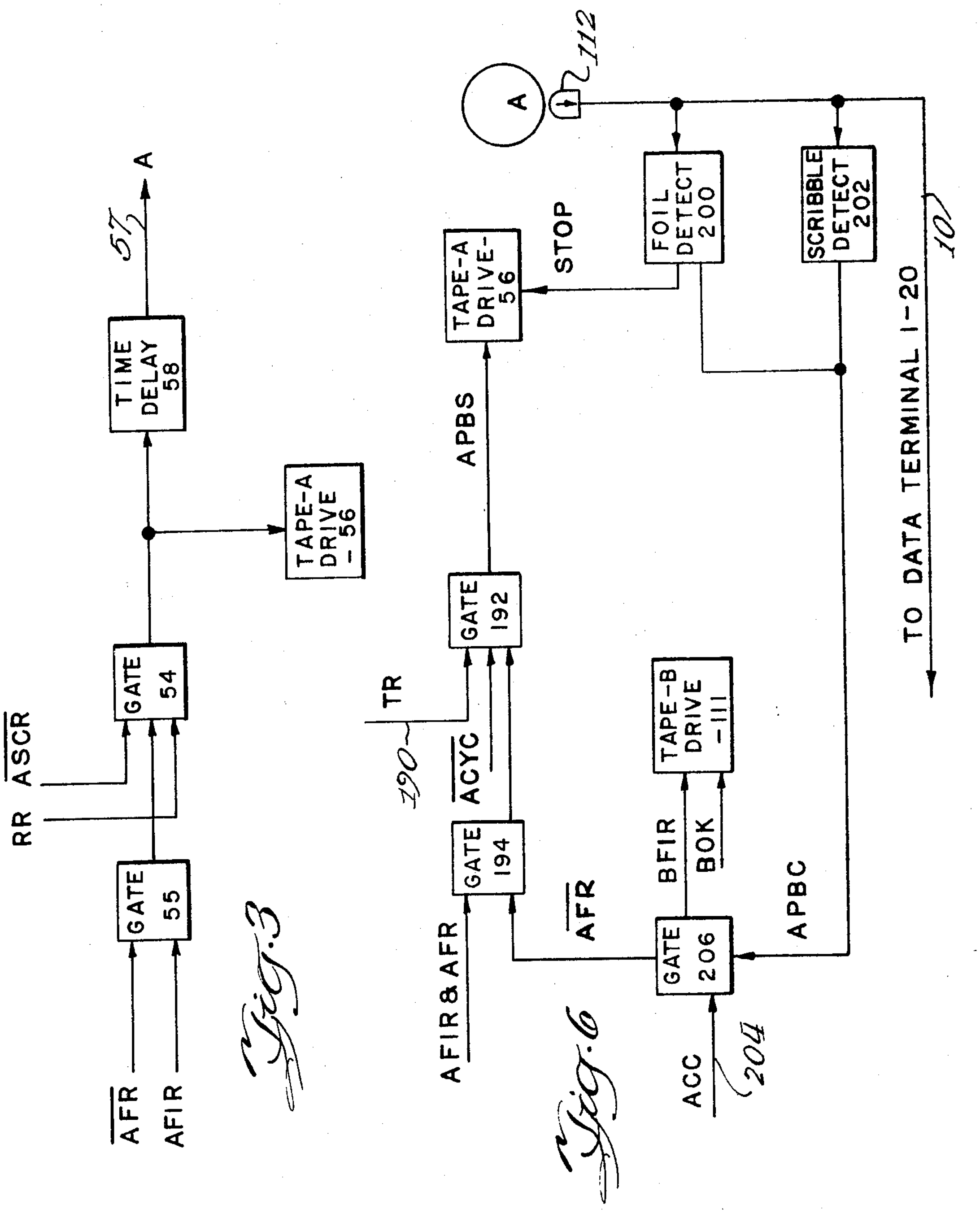
FIG. 3 illustrates apparatus for controlling the recording of the coded tones at the data station recorder.
FIG. 6 illustrates apparatus controlling the selective playback of the coded tones recorded at the data station.

Referring now to FIG. 3 there is illustrated the apparatus for controlling the removal of information from the register when either tape A or B is ready to record. As is indicated in FIGS. 2 and 3, when register 44 contains a full complement of data bits, a Request to Record (RR) is sent from register 44 on line 53 to gate 54. Assuming that tape A is first (AFIR) and has not finished recording (AFR), gate 55 is operated to provide an indication that tape A is in condition to record (AR). If there is no "scribbling" being performed (ASCR) on tape A, gate 54 will be enabled to initiate the drive 56 of tape A. A delayed Acknowledgement signal (A) is coupled on line 57 back to the clock 46 to indicate that tape A has been signaled to start recording. It is to be understood, of course, that the record heads for tape A and for the particular track then being used are put in operation in accordance with well known techniques. It may be noted that a time delay is provided by time delay apparatus 58 in the Acknowledgement signal line. The slight delay afforded by time delay 58 accounts for the normal start-up time of the tape drive unit so that tape A will be up to operating speed and ready to take data when such data is serially removed from register 44.

In an alternative aspect of this invention, the converted tones at the output of oscillators 51 and 52 can be coupled to lines 36 for transmission to the coded tone recorder 26 at the central data terminal for later conversion to the original digital data.

RING-IN SEQUENCE

When the particular stations are called by the central data terminal 20, for the purpose of forwarding the information recorded on tapes A or B, the information is taken from the corresponding playback heads and sent back over the particular telephone line 10 connecting the called station with the data terminal 20. The coded tones are then converted by converter 26 into a form suitable for operating the various output devices desired as shown in FIG. 1. The converter 26 can be a device which converts coded tone information into corresponding contact closures, for instance, the Bell Systems Data Set 401 J.

Figure 4:
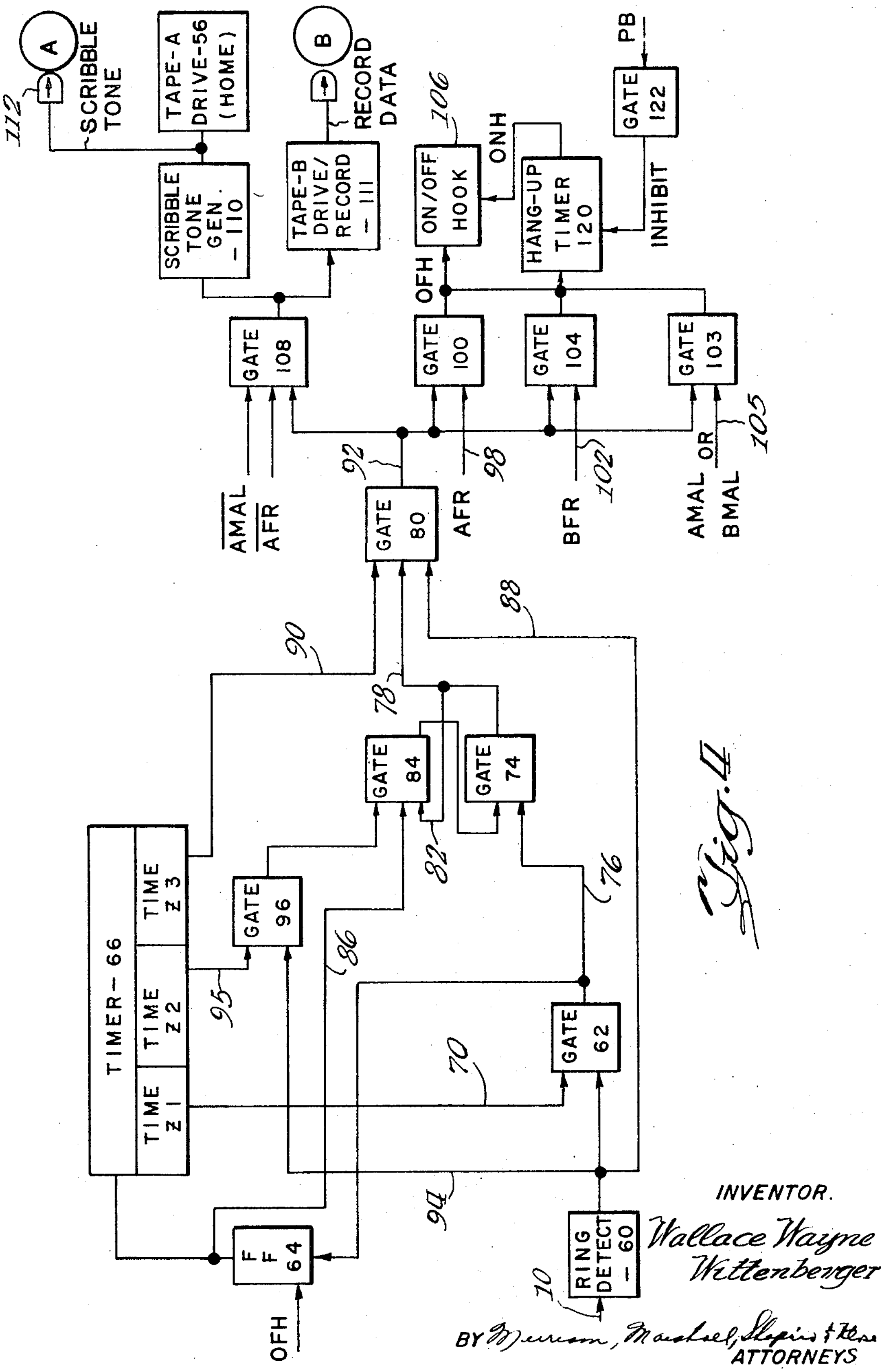
FIG. 4 illustrates control apparatus for providing a selective connection between the data station and a calling party, and also controlling corresponding operations of the data station.
Figure 5:
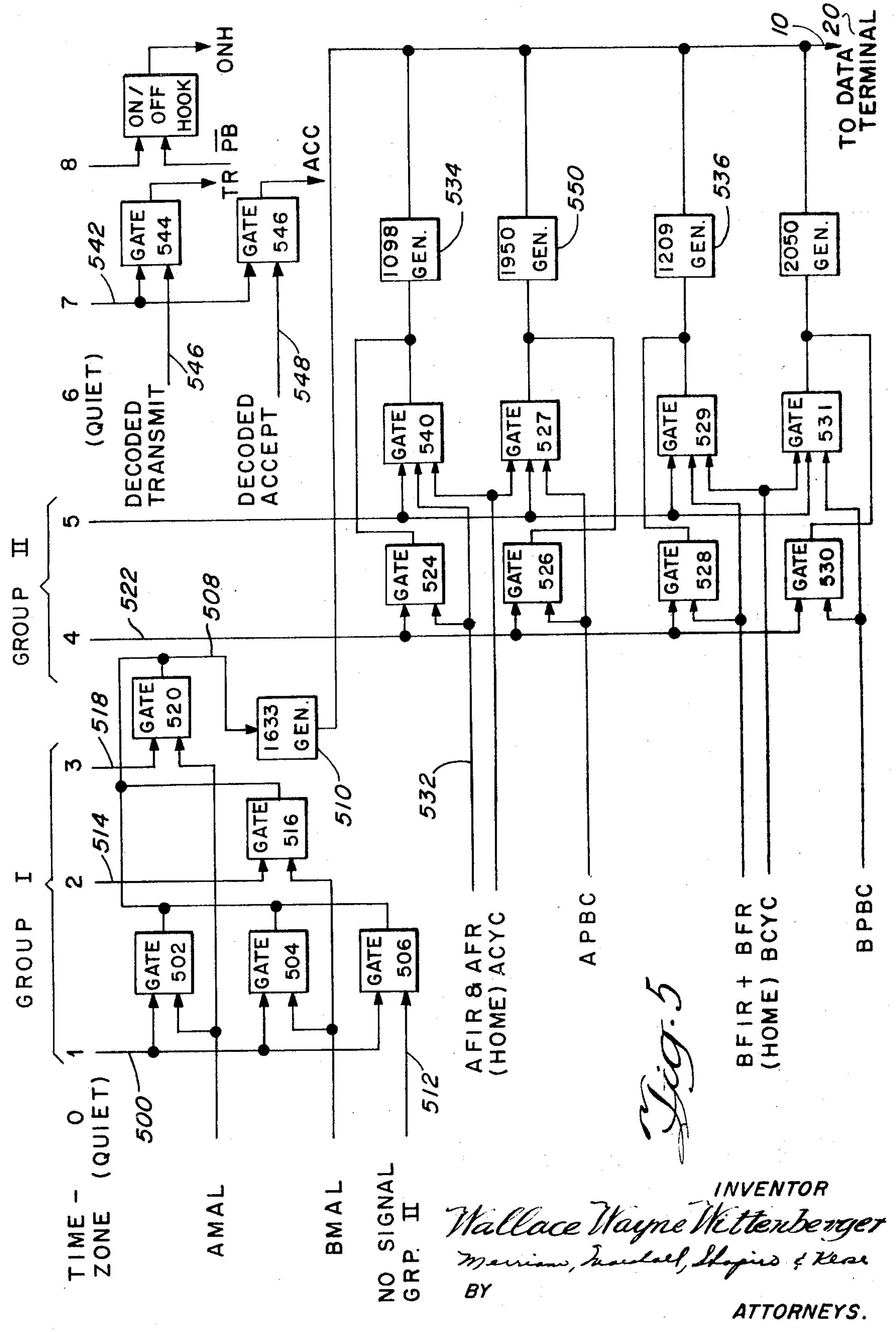
FIG. 5 illustrates apparatus providing the generation of status tones for indicating the operating condition of the remote station.

Referring now to FIGS. 4–6 there is shown the various control and logic apparatus for controlling the transfer of information from the remote stations to the central data terminal as schematically shown in FIG. 1 by the central control unit 22 and the respective station control units 24.

In the following description, it will be assumed that the central control unit 22 has sequentially selected station I and that by suitable well known means a ring signal is sent over telephone line 10 which is coupled into the station control unit 24. Referring to FIG. 4, there is illustrated a ring detect circuit 60 which receives the ring signal and couples a suitable signal to gate 62, the output of which operates flip flop 64 to start the ring-in timer 66. This initiates a three zone coded timing sequence to prevent unauthorized users from coupling through phone line 10 into the station apparatus. Timer 66 effectively sets the logic apparatus into time zone 1 which is initiated on the first ring and lasts for approximately 30 seconds. The calling party (data terminal 20), hangs up after hearing at least one ring to the called station. In the meantime, the timer 66 continues to run and at the end of the approximately 30 seconds for time zone 1, a disabling signal is coupled to gate 62 at input line 70 to disable gate 62 during time zone 2.

The initial ring also actuates gate 74 from line 76 so as to put a ready condition on line 78 at the input of gate 80 and on line 82 at the input of gate 84. A ready condition on line 86 at the input of gate 84 was also set by the operation of flip flop 64 from the initial ring. Assuming there have been no other rings into the station during time zone 2, when the data terminal rings properly during time zone 3, so as to put an enable signal on line 88 of gate 80 (since there existed a ready condition on line 90, due to the timing being in time zone 3), gate 80 operates to provide a possible off-hook condition on output line 92. If, however, an unauthorized user had called in on phone line 10 during the time interval of time zone 2, the combination of a ring on 94 and being in time zone 2 as conditioned on line 95, actuates gate 96, which in turn resets gates 84 and 74, thus removing the enable signal on line 78 at the input to gate 80. Although the timer 66 continues to run through time zone 3, the absence of the enable signal on line 78 will prevent actuation of gate 80 during time zone 3 when a ring-in signal appears at line 88.

Assuming, however, that the only ringing into the station had been performed by the data terminal in time zone 1 and during time zone 3, a suitable signal would then have been presented as described previously on line 92. Once the ready signal is present on line 92, the station can go "off-hook" (OFH — i.e., connect itself to phone line 10) or go into a Scribble Generate Mode. In the first instance, if either tape A or tape B has been completely filled with data, a suitable ready signal will be presented to either line 98 at the input of gate 100 which would indicate that tape A has finished recording (AFR) and was at the home position ready to playback, or at line 102 at the input of gate 104 which would indicate that tape B has finished recording and was ready to playback. Also, if either the tape A or B unit is malfunctioning, a suitable signal is presented to gate 103 on input line 105. Operation of gate 100, 104, or 103 would thus operate conventional off-hook apparatus 106 to connect the station to the data/terminal via telephone line 10. In the alternative, if neither of the tapes A or B was full (completely loaded with data) and both tapes A and B were functional, the ringing sequence from the data terminal would not be answered. However, the ready signal on line 92 will operate gate 108 to place a special "-scribble tone" on tape A (assuming this tape is then being recorded and tape A is not yet full) through scribble tone generator 110. Tape A will then be driven back to its home or starting position, and simultaneously, the tape B drive and record mechanism 111 is initiated to continue the recording of data.

Hang-up timer 120 will cause the station to go permanently on hook (ONH) after approximately 1 ½ minutes unless an inhibit signal is present at timer 120. Such inhibit signal continuously resets the timer 120 to zero, and is provided at the output of gate 122 during playback so that the station remains in the off-hook condition. The completion of a playback operation removes the inhibit signal from hang-up timer 120, thereby enabling the timer to run out after approximately 1 ½ minutes and disconnect the station from the phone line 10.

If at the time an enabling condition is present on line 92, neither of the tapes A or B is full, as previously described, the scribble tone generator 110 is operated to record on tape A through the record/playback head 112 (assuming tape A is then recording the data) an "end of data" indication, which as an example can be a 1,633 Hz. signal lasting for 10 seconds. Tape A is then driven to its home or starting position, and when the tape is in its home position, a finished recording signal (AFR) is coupled to gate 100 and the station is now in condition to be placed off-hook (OFH). The central data terminal 20, after allowing maximum time for the tape A to get from any playing position back to home (that is a full tape cycle), then re-initiates the ringing sequence of ring time zone 1, time zone 3 as previously described. This operates gate 100 and places the station off-hook. If the second ringing sequence from the data terminal to the station is attempted after a preselected period of time, the call will not be answered and, instead, after time zone 3 the timer 66 will cycle back to the zero reference time and the call sequence then must be re-initiated.

STATUS TONES

Once the station has gone off-hook, a series of tones are sent during selected time zones from the station to the data terminal to indicate the status and condition of the station equipment as can be seen with reference to FIG. 5.

For convenience, FIG. 5 has been arranged into eight time zones each of which are controlled by a clock and divided into clocking cycles of 1 ½ seconds each for a duration of 64 cycles or approximately 1 ½ minutes. The initial time zone 0 as indicated in FIG. 5 is a quiet zone which is used as a reference interval between the station having gone off-hook and before transmission of the following status tones. The first Group I of status tones indicates the condition of the tapes A and B. Thus, in status time zone 1 of Group I, the suitable clock presents an operating signal on line 500 to ready gates 502, 504 and 506. In the event either tape A or tape B is malfunctioning (AMAL or BMAL) gate 502 and/or 504 will be operated during this first time zone to place an operating signal on input line 508 of the 1,633 Hz. generator 510 whose output is coupled to the telephone line 10. Also, if there is no signal from the group II apparatus, which indicates that neither of the tapes A or B is full, an operate signal will be present on line 512 at the input of gate 506 to actuate generator 510 and thereby provide such an indication on telephone line 10.

During status time zone 2 within information group I, a ready signal is present from the cycling counter on line 514 at the input to gate 516 to operate generator 510 in the event tape B is malfunctioning. A similar situation is presented during status time zone 3 by the counter ready signal on line 518 at the input of gate 520 to operate generator 510 in the event tape A is malfunctioning. Therefore, it can be seen that in the time zones 1, 2 and 3 incorporated in information group I, operation of the 1,633 Hz. generator 510 during time zones 1, 2 and 3 indicates that both tapes A and B are malfunctioning; operation of generator 510 only in time zones 1 and 2 indicates that only tape B is malfunctioning; and operation of the generator 510 in only time zones 1 and 3 indicates only tape A is malfunctioning.

The following status time zones 4 and 5 within timing group II in FIG. 5 are provided to indicate whether tape A or tape B has finished recording or playback, and whether either tape is in the home position.

That is, as shown in FIG. 5, status time zone 4 information relates to finished recording or playback, and time zone 5 information relates to the home position status.

More specifically, during status time zone 4 the cycling counter places a ready condition on line 522 at the input to gates 524, 526, 528, and 530. Assuming that tape A has finished recording (AFR) and contains the information first recorded (AFIR) an operate signal is present on the second input line 532 to gate 524 so as to operate this gate and initiate the 1,098 Hz. generator 534 to place this signal on the telephone line 10 which indicates to the central data terminal that tape A has finished recording. If tape A has completed cycling, and is in the home position, during time zone 5 gate 540 is operated to initiate the 1,098 Hz. generator 534.

Upon the completion of playback of tape A, in status time zone 4 gate 526 is operated to initiate the 1,950 Hz. generator 550 which indicates tape A has finished playback. Generator 550 is also initiated during time zone 5 if tape A is in the home position. Similar operations as described above are performed for tape B, as shown in FIG. 5.

Status time zone 6 is a quiet zone during which no tone information is transmitted between the station and the data terminal. During time zone 7 the cycling clock puts a ready condition on line 542 at the input of gates 544 and 546 so as to ready these gates to receive a Transmit or Accept signal from the central data terminal. Upon receiving a Transmit signal from the central data terminal, the signal is decoded at the data station and applied to line 546 to operate gate 544 and provide an operating Transmit signal (TR) at the output of gate 544 to initiate the playback of the proper tape as will be described in more detail in the next section. Similarly, the data station can also receive an Accept signal from the central data terminal which is decoded in the data station and placed on line 548 at the input of gate 546 to provide an operating Accept signal (ACC) to initiate an indication that tape B now contains the oldest data (BFIR). data During status time zone 8, if no playback operation is then taking place, the on/off hook apparatus 106 is operated to provide an on hook (ONH) signal to terminate the connection between the data station and the central data terminal.

To indicate the end of the playback operation of tape A (APBC), gate 526 is operated during status time zone 4 to operate the 1,950 Hz. tone generator 550 with the corresponding tone being placed over the telephone line 10 to the central data terminal. If tape A had been cycling after playback and has now completed cycling and has returned to the home position (ACYC), the 1,950 Hz. tone from generator 550 is transmitted both during status time zones 4 and 5. Similar operation is provided for tape B.

PLAYBACK

Referring now to FIG. 6, there is illustrated the control apparatus for directing the playback operation. During status time zone 7, as Transmit signal (TR) is present from the data terminal on line 190 at the input of gate 192. Assuming that tape A has finished recording (AFR) and contains the first data entered (AFIR), gate 194 will be enabled to place a ready signal into gate 192. Gate 192 is therefore enabled and provides a playback start signal for tape A, which signal (APBS) is coupled through suitable means to start the drive mechanism 56 of tape A so that the coded tone information thereon can be coupled through record/playback head 111 and through suitable amplifiers to the data terminal 20.

The tape A then continues in its playback cycle until the foil is encountered at the tape end at the home position which is detected by the foil detect apparatus 200 to stop the tape A drive mechanism 56. If playback had been initiated after a scribble tone had been placed on tape A, the tape would have continued in the playback condition until the scribble mark was detected by scribble detect apparatus 202 so as to provide a playback complete indication (APBC). Since there is no playback operation then in progress, the status tone generator 550 signals 1,950 Hz. in status time zone 4. Once tape A reaches home, (ACYC) on the APBC signal is sent in both zones 4 and 5. This eliminates the requirements of playing back unfilled tape, a waste of both time and telephone toll charges. Also, the Accept signal can be sent from the central data terminal even though tape A has not returned to the home position.

In either case, at the completion of transmission of tape A data, tone generator 550 (see FIG. 5) is operated to return an APBC tone to the data terminal to indicate the tape A data has been sent but has not as yet been accepted by the data terminal.

An Accept on tape A also causes tape B to become the oldest data (BFIR signal now present). All status tones generated now come from tape B. If, in the meantime, tape B has now become filled with data, the BPBR tone generator 536 is operated to indicate that tape B is ready for playback. The data terminal may decide to hang up, check the data received using standard parity check techniques, and then call back at a later time. If the data is found to be in order, the data terminal transmits an Accept tone which causes tape A to be released for acceptance of input data. As shown in FIG. 6, this is provided by the Accept tone (ACC) being coupled on line 204 into gate 206 which places tape A in condition for recording data. Also, gate 206 provides an AFR at the input of gate 194 to prevent tape A from returning to the playback condition. However, tape B which is now recording data must first become full before any further data can be recorded on tape A. Data is thus always transmitted on a first-in-first-out basis.

If, upon receipt of the Accept tone from data terminal 20, tape B is not full, a short 1,633 Hz. tone will be sent in status time zone 1 to the data terminal so that the data terminal would then hang up. Hang-up timer 120 (FIG. 4) would then operate, and with the removal of the inhibit signal the station would automatically return to the on-hook condition and be disconnected from the central terminal. Initiation of an "Accept" signal can be delayed. Hang-up of the data station can be executed and a later call from the central terminal initiated, at which time either a "Retransmit" (same as Transmit) can be sent out (in case of bad data) or "Accept". Accept clears the tape for reuse.

Although the present invention has been described in terms of the conversion of digital data into coded discrete audio frequencies or tones, it must be realized that it is within the skill of the art to apply the teachings here to convert said digital data into other corresponding discrete frequencies using various forms of modulation, such as amplitude and frequency modulation and recording said corresponding discrete frequencies in the medium, high, or RF frequency ranges rather then in the audio frequency range.

The foregoing detailed description has been given for clearness of understanding only, and no unnecessary limitations should be understood therefrom, as modifications will be obvious to those skilled in the art.

What is claimed is:

1. A data collecting and transmitting system for collecting digital data at a plurality of remote data stations and selectively transmitting the collected data at each station to a central data terminal, each of said remote data stations comprising:

an input data device at each station receiving digital data entered into said device representing information pertaining to said station;

tone generating means selectively activated for providing a series of discrete tones;

actuating means interconnecting said data device to said tone generating means for actuating a series of coded tones corresponding to said digital data correlated with the entering of said data in said input device, audio recording means including a recording medium recording said coded tones simultaneously upon generation thereof;

playback means for detecting said coded tone information stored on said recording medium and transferring the coded tones to the data terminal; and coded ring timing apparatus for enabling only said central data terminal to connect to the called station, said apparatus including, a ring-in timer having three consecutive timing sequences starting from a reference time zero;

means for initiating the first timing sequence upon detection of a first ring at the called station, said timer automatically sequencing through the first, second and third timing sequences; and means for connecting said data terminal to said called station upon detection of a second ring occurring within the third timing sequence.

2. A data collecting and transmitting system for collecting digital data at a plurality of remote data stations and selectively transmitting the collected data at each station to a central data terminal, each of said remote data stations comprising:

an input data device at each station receiving digital data entered into said device representing information pertaining to said station;

tone generating means selectively activated for providing a series of discrete tones;

actuating means interconnecting said data device to said tone generating means for actuating a series of coded tones corresponding to said digital data correlated with the entering of said data in said input device;

audio recording means including a recording medium recording said coded tones simultaneously upon generation thereof;

playback means for detecting said coded tone information stored on said recording medium and transferring the coded tones to the data terminal;

two recording mediums;

means for alternately recording said coded tones on said recording mediums; and detecting means detecting the recording medium having the data first recorded and for transmitting said first recorded data to said data terminal via said playback means.

3. A data collecting and transmitting system for collecting digital data at a plurality of remote data stations and selectively transmitting the collected data at each station to a central data terminal, each of said remote data stations comprising:

an input data device at each station receiving digital data entered into said device representing information pertaining to said station;

tone generating means selectively activated for providing a series of discrete tones;

actuating means interconnecting said data device to said tone generating means for actuating a series of coded tones corresponding to said digital data correlated with the entering of said data in said input device;

audio recording means including a recording medium recording said coded tones simultaneously upon generation thereof;

playback means for detecting said coded tone information stored on said recording medium and transferring the coded tones to the data terminal;

two recording mediums;

means for alternately recording said coded tones on said recording mediums;

a scribble tone generator providing a scribble tone;

means for recording said scribble tone on one of said recording mediums;

means detecting the unfilled condition of both of said recording mediums and identifying the recording mediums then in the record mode;

gating means recording said scribble tone on said identified recording medium to indicate the end of the data portion; and said gating means including means returning said identified recording medium to its initial data entry position and starting said other recording medium to initiate the recording of data thereon.

4. A data collecting and transmitting system as claimed in claim 1, including control means for cycling said timer back to said reference tine zero upon detection of a second ring at the called station occurring within the second timing sequence, and preventing a data connection between said called station and the telephone line.

5. A data collecting and transmitting system as claimed in claim 2, including second tone generating means for providing a second series of tones, and actuating means responsive to said detecting means for actuating said tone generating means in a series of status tones indicating the operational status of said respective recording mediums.

6. A data collecting and transmitting system as claimed in claim 3, including scribble tone detect means for detecting during playback said scribble tones at the end of the data portion of said identified recording medium, and drive means for returning said medium to its initial data entry position, thereby preventing playback operation during non-data portions of said recording medium.

* * * * *